Figure 1:
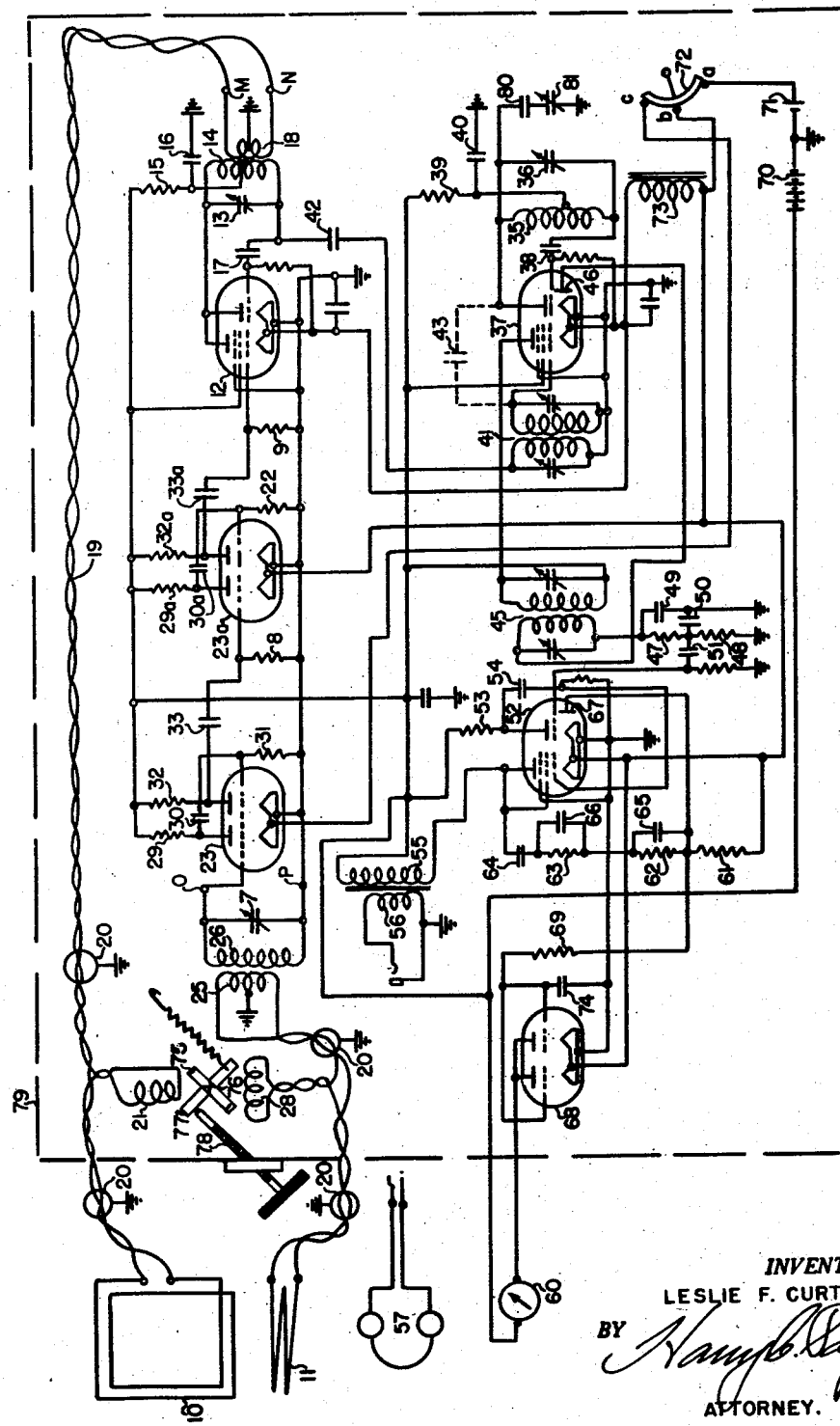

Aug. 17, 1948.　　　　L. F. CURTIS　　　　2,447,316
VARIABLE FREQUENCY OSCILLATORY SYSTEM
Filed Nov. 27, 1945　　　　2 Sheets-Sheet 1

INVENTOR:
LESLIE F. CURTIS,
BY
ATTORNEY.

Aug. 17, 1948.   L. F. CURTIS   2,447,316
VARIABLE FREQUENCY OSCILLATORY SYSTEM
Filed Nov. 27, 1945   2 Sheets-Sheet 2

INVENTOR:
LESLIE F. CURTIS,
BY Harry C. Page
ATTORNEY.

Patented Aug. 17, 1948

2,447,316

UNITED STATES PATENT OFFICE 2,447,316

VARIABLE FREQUENCY OSCILLATORY SYSTEM

Leslie F. Curtis, Great Neck, N. Y., assignor, by mesne assignments, to Hazeltine Research, Inc., Chicago, Ill., a corporation of Illinois Application November 27, 1945, Serial No. 631,053

9 Claims. (Cl. 250—36)

This invention relates to variable-frequency oscillatory systems of the type in which variations of a coupling effect between input and output terminals of an impedance network of the system are utilized to produce a change of the oscillation frequency. While the invention is of general utility, it is particularly suitable for use in an indicating system to indicate the presence of a hidden mass of material of such nature as to have a different effect on the impedance network of the oscillatory system than does the substance of its surroundings, and will be described in that connection.

The present application is a continuation of abandoned application Serial No. 425,155, filed December 31, 1941, entitled "Electrical indicating system," which is assigned to the same assignee as the present application.

It is frequently desirable to detect the presence of a hidden mass of material having a characteristic different from that of its surroundings. For example, it may be desirable to detect, by an electrical arrangement, the presence of a hidden mass of material having electrical permeability different from its surroundings. Also, it may be desirable to detect, by an arrangement of the same type, the presence of a hidden mass of material having high electrical conductivity which causes a somewhat similar reaction in an electrical circuit. To give a concrete example, it may be desired to locate a metal object such as a pipe or conductor which is buried in the ground. Various arrangements have been proposed to detect the presence of such buried objects. Thus, it has been proposed to utilize the change in the reactive effect of an exploring inductor, due to the presence of a hidden conductive mass of material, upon a reactance network including the exploring inductor, to determine the presence of such mass of material. However, in arrangements of this sort the change of the reactive effect of the exploring inductor on the network, due to the presence of a hidden mass of material of the type under consideration, varies approximately inversely as the sixth power of the distance between the exploring inductor and the hidden mass of material. Prior art arrangements of the type mentioned above therefore have not been nearly as sensitive as is desired. It is, therefore, desirable to provide an improved variable-frequency oscillatory system having exceptionally high sensitivity to variations of a coupling effect between input and output terminals of an impedance network included in the system and one which is particularly suitable for use in a system for detecting the presence of a mass of material of such nature as to have a different effect on the impedance network than does the substance surrounding the material.

It is an object of the present invention to provide a new, improved and very sensitive variable-frequency oscillatory system the frequency of oscillation of which changes rapidly with impedance variations of an impedance means included in an impedance network of the system.

It is a further object of the present invention to provide an improved variable-frequency oscillatory system particularly suitable for use in an indicating system for detecting the presence of a hidden mass of material of such nature as to have a different effect on an impedance network than does the substance surrounding the material.

It is still another objection of the invention to provide a new and improved variable-frequency oscillatory system which includes an exploring inductor so disposed that a variation of its reactive effect upon a network including the inductor is utilized to effect a substantial change of the frequency of oscillation of the system.

In accordance with a particular form of the invention, a variable-frequency oscillatory system comprises an impedance network having input and output terminals and including a passive mutual-reactance network normally balanced to provide a substantially zero value of feed-back voltage from the input to the output terminals. The mutual-reactance network is responsive to a frequency-control condition external thereto in space for modifying the balance of such network to provide feed-back voltage from the input to the output terminals. The system also includes an oscillator for generating oscillations, means for applying the oscillations to the aforesaid input terminals, means for amplifying the oscillations translated through the network to the aforesaid output terminals, and means for applying the amplified oscillations back to the oscillator in such phase as to shift the oscillator frequency in response to the aforesaid modification of the network balance.

For a better understanding of the present invention, together with other and further objects thereof, reference is had to the following description taken in connection with the accompanying drawings, and its scope will be pointed out in the appended claims.

Figure 2:
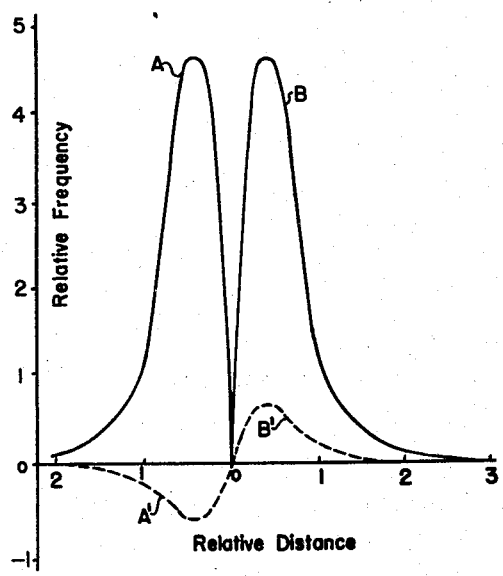
Figure 3:
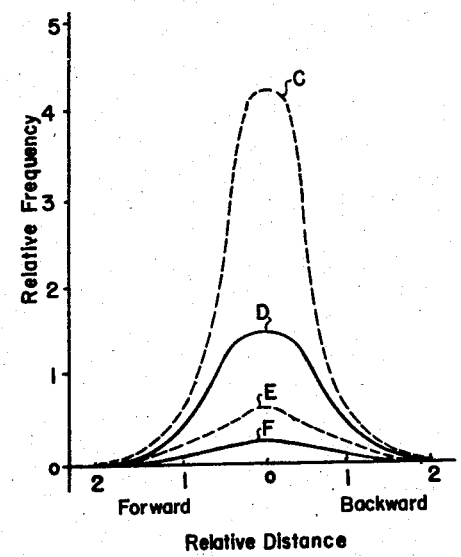

Fig. 1 of the drawings is a circuit diagram, partly schematic, of a complete variable-frequency oscillatory system embodying the present invention as utilized in an arrangement for detecting the presence of a hidden mass of material; Figs. 2 and 3 of the drawings comprise graphs utilized to explain certain of the operating characteristics of the arrangement of Fig. 1; while Fig.

4 represents a portion of a variable-frequency oscillator embodying a modified form of the invention.

Referring now more particularly to the drawings, the circuit of Fig. 1 comprises a variable-frequency oscillatory system, in accordance with the invention, as utilized in an arrangement for indicating the presence of a hidden mass of material of such nature as to have a different effect upon an impedance network of the oscillatory system than the substance surrounding the material. The oscillatory system comprises an impedance network having input terminals M, N, and output terminals O, P, and providing in the absence of an external frequency-control condition a minimum value of one component of coupling between the input terminals M, N and the output terminals O, P. This network includes a variable impedance means which is responsive substantially only to the occurrence of the aforementioned condition for varying the aforementioned one component of coupling. This means comprises a first exploring inductor 10 and a second exploring inductor 11 with the latter so disposed with reference to inductor 10 that the effective coupling therebetween is normally inappreciable but is increased to an appreciable value in the presence of the external frequency-control condition. This latter condition, in the particular arrangement shown, is one arising from the presence in the vicinity of the inductors 10, 11 of the aforementioned hidden mass to be detected. Specifically, the inductors 10 and 11 are disposed with their axes normal to each other and so that the axis of inductor 11 passes through the center of inductor 10. This disposition of two inductors is a well-known arrangement in which there is no coupling between the inductors.

The variable-frequency oscillatory system of Fig. 1 also comprises an oscillator for producing oscillations and means for applying the generated oscillations to the input terminals M, N. As illustrated in the drawings, this oscillator is of the Hartley type and the oscillator tube thereof comprises the triode section of a triode pentode 12. The oscillator comprises a frequency-determining circuit including a capacitance 13 and an inductor 14, to the midtap of which is connected the anode supply voltage for tube 12 through a resistor 15 by-passed to ground by a condenser 16. One end of inductor 14 is connected to the anode of the triode section of tube 12 while the other end of inductor 14 is coupled to the grid of this tube section through a condenser 17.

In order to excite exploring inductor 10 with the oscillations produced by the oscillator just described, an inductor 18 is inductively coupled to inductor 14 and is connected through the terminals M, N and through leads 19 to the terminals of exploring inductor 10. These leads are shielded in a suitable manner, as indicated by elements 20 which may comprise grounded metal tubing, and an inductor 21 is series connected therein between inductor 18 and exploring inductor 10 for a purpose which will be described more fully hereinafter.

The variable-frequency oscillatory system of Fig. 1 also comprises means for amplifying the oscillations, translated through the impedance network having input terminals M, N and output terminals O, P, and means for applying the amplified oscillations back to the oscillator, comprising the triode section of tube 12, in such phase as to shift the oscillator frequency in response to variations of a component of coupling between terminals M, N and O, P.

Oscillations may, under certain operating conditions of the system presently to be considered, be developed in inductor 11 due to the oscillations applied to the inductor 10, and in order that the oscillations in inductor 11 may be used to vary the frequency of the oscillator as described, these oscillations are applied through an amplifier including tubes 23 and 23a, connected in cascade, to the input circuit of the pentode section of tube 12, which pentode section comprises a control tube for varying the effective reactance introduced in the frequency-determining circuit 13, 14.

Tubes 23 and 23a are of the duplex-triode type and the input circuit of the first triode of tube 23 is coupled through a transformer 25, 26 to the terminals of inductor 11. The midtap of the primary winding 25 is grounded and the leads from the winding 25 to the inductor 11 are shielded, as indicated by the element 20, in the manner described above. An inductor 28 is serially included in this circuit for a purpose to be described more fully hereinafter.

The output circuit of the first triode section of tube 23 is coupled by means of a load resistor 29 and a coupling condenser 30 to the input circuit of the second triode section of tube 23, a grid leak 31 being provided for the input electrode of the second section of the duplex tube 23.

The signal output of the second triode section of tube 23 is, in turn, coupled, by means of a load resistor 32 and a coupling condenser 33, to the input circuit of the first triode section of tube 23a, a suitable grid-leak resistor 8 being provided for this first section of tube 23a.

The output circuit of the first triode section of tube 23a is coupled, by means of a load resistor 29a and a coupling condenser 30a to the input circuit of the second triode section of tube 23a, a suitable grid-leak resistor 22 being provided for the control electrode of the latter section. The output circuit of the second triode section of tube 23a is coupled to the input circuit of the pentode section of tube 12 by means of a load resistor 32a, a coupling condenser 33a, and a grid-leak resistor 9.

The two anodes of tube 12 are directly connected and a 90-degree phase shift is provided for the feed-back control circuit of the oscillator by tuning the secondary winding of the transformer 25, 26 by a condenser 7 to the nominal frequency of the oscillations generated by the triode section of tube 12; that is, the net phase shift in the feed-back circuit of the oscillator which comprises inductors 10 and 11 is an odd multiple of 90 degrees.

The indicator arrangement, per se, of Fig. 1 includes means responsive to the variations in the frequency of the oscillations produced by the oscillatory system above described for indicating the amount of variation of the above-mentioned component of coupling caused by variations in the impedance means including inductors 10 and 11. Specifically, the amount of variation of the reactance component of coupling is used to indicate the presence of a mass of material of such nature as to have a different effect on the impedance network, including variable impedance means 10, 11, than the substance of its surroundings. This last-named means comprises a second oscillator and means responsive to variations of a difference frequency derived from the second oscillator and the first oscillator including frequency-determining circuit 13, 14 for producing either an audible or a visible indication. This second oscillator is also of the Hartley type and includes a frequency-determining circuit 35, 36 and the triode section of a diode-triode-pentode tube 37. It is desirable that a large difference frequency be obtained from a relatively small change of frequency of the first oscillator. This is effected by tuning the frequency-determining circuit 35, 36 of the second oscillator to the seventh harmonic of the nominal frequency of the first oscillator. One end of inductor 35 is coupled to the control grid of the triode section of tube 37 through a condenser 38 and the other end of inductor 35 is connected directly to the anode of this section of tube 37. Unidirectional operating potential for the triode section of tube 37 is supplied through a resistor 39 connected to the midtap of inductor 35, a suitable by-pass condenser 40 being also provided.

In order to combine the oscillations developed in tube 12 with the oscillations developed in tube 37, the seventh harmonic of the oscillations developed in tube 12 and the oscillations developed in the second oscillator are applied to an amplifier which includes the pentode section of tube 37. A double-tuned transformer 41, provided for this purpose, has the primary winding thereof coupled through condenser 42 to the frequency-determining circuit 13, 14 and the secondary winding thereof connected directly to the control grid of the pentode section of tube 37, the oscillations developed by the second oscillator being also coupled by means of a condenser 43 to the control grid of the pentode section of tube 37. The condenser 43 is shown in dotted lines for the reason that it may be made up in whole or in part of the interelectrode capacitance of tube 37. Transformer 41 is tuned to the seventh harmonic-frequency component developed by the first oscillator. The signal output from the pentode section of tube 37 is coupled through the transformer 45, which is also tuned to the seventh harmonic frequency developed by the first oscillator and thus to the frequency of the second oscillator, to the diode rectifier including the anode 46 within the envelope of the tube 37 wherein the oscillations derived from the first and second oscillators are heterodyned. The load circuit for the rectifier includes resistors 47 and 48 connected in series and having associated therewith by-pass condensers 49 and 50, respectively.

The rectified beat note of the heterodyned oscillations, which is developed across load resistor 48, is coupled by means of a coupling condenser 51 to the input circuit of the triode section of a diode-triode-pentode tube 52 for amplification. The signal output of the triode section of tube 52 is coupled, through a circuit including load resistor 53 and a coupling condenser 54, to the pentode section of the tube 52 for further amplification.

The anode of the pentode section of tube 52, which section is connected as a triode, is connected to the primary winding 55 of an audio-frequency transformer 55, 56, to the secondary winding 56 of which headphones 57 are adapted to be connected by means of a suitable plug and jack.

In order to provide a visual indication of the frequency variations of the first oscillator there is provided a meter 60 to which a current is supplied through the medium of a tube 68 and a suitable frequency-responsive network, comprising resistors 61, 62, 63, coupled in series through a condenser 64 between the anode and the cathode of the pentode section of tube 52. Resistor 62 is by-passed by a condenser 65 and resistor 63 is by-passed by a condenser 66. The voltage developed across resistor 61 is rectified in the diode rectifier, including anode 67 within the envelope of tube 52, and the rectified voltage is applied to the input circuit of the duplex-triode amplifier 68, resistor 61 thus comprising the load circuit for the diode which includes anode 67. The triode sections of tube 68 are effectively connected in parallel and the voltage developed across resistor 61 is coupled to the control electrodes of the tube through a resistor 69 and a filter condenser 74, while the meter 60 is included in the common output circuit of the two triode sections.

Suitable operating potentials are provided for the tube circuits just described by means of a source of B supply 70 and a source of filament or A supply 71, the filament circuits of the tubes being completed through a three-position switch 72 comprising contact points a, b and c. The filament of tube 23 is connected directly to contact c and the remaining filaments are connected to contact b, the filaments of oscillator tubes 12 and 37 being connected to contact b through a choke 73. The circuit is thus such that, in one position of the movable member of switch 72, the circuit is fully operative and in another position the contact c is disconnected from the source of filament supply 71, thereby de-energizing the filaments of tube 23.

While it is intended that the coupling between inductors 10 and 11 normally be inappreciable, it has been found that, as a practical matter, this coupling is usually normally of a very low but appreciable value and that it is necessary to provide an auxiliary arrangement for reducing the effective coupling between exploring inductors 10 and 11 to an inappreciable value. It is for this purpose that the inductors 21 and 28 are provided. These inductors are physically positioned normally to have substantially no coupling therebetween. Between these inductors there is disposed a movable inductive coupling means such as a metal disc 75 so disposed with reference to the inductors 21 and 28 that, in a given position in its path of motion, it is substantially uncoupled with at least one of inductors 21 and 28, and, in another position in its path of motion, it is substantially coupled with both of inductors 21 and 28. The movable inductive coupling means 75 is adapted to be rotated about a center 76 and a means, comprising an operating arm 77 of insulating material, is rigidly fastened to inductive coupling means 75, and a screw 78 threaded into a conductive shield 79, is provided for adjusting the coupling between inductors 21 and 28. The adjustable coupling system, comprising elements 21, 28, 75, 76, 77, 78, may be constructed in accordance with one of the arrangements described in applicant's United States Letters Patent entitled "Adjustable coupling system," No. 2,312,687, granted March 2, 1943.

In order to provide a frequency adjustment for the second oscillator there is provided a control circuit including a series-connected fixed condenser 80 and variable condenser 81 connected between the anode of the triode section of tube 37 and ground.

In considering the operation of the variable-frequency oscillatory system of Fig. 1, it will first be assumed that the system is so adjusted, if necessary by adjustment of the coupling means 75, that no appreciable or detectable coupling effect exists between inductors 10 and 11, and it will further be assumed that the seventh harmonic frequency of the first oscillator is equal to the frequency of the oscillations produced by the second oscillator. Under the conditions assumed, no oscillations are induced in inductor 11 from inductor 10 and hence no voltage is fed back from inductor 11 to the frequency-determining circuit 13, 14 through the circuit comprising amplifiers 23 and 23a, and the control or pentode section of tube 12. However, in case a mass of material having an effective permeability different from that in the general vicinity of exploring inductor 10 is brought into proximity with inductor 10, some voltage is induced in inductor 11 from the inductor 10. The magnitude of this voltage, and the amplitude of the resulting oscillations developed in inductor 11, depends upon the volume, proximity, permeability, and disposition of the above-mentioned mass of material. The frequency of the oscillator section of tube 12 is varied in accordance with the amplitude of the oscillations induced in inductor 11. If, on the other hand, a mass of material having high conductivity is brought into close proximity to the exploring inductors 10, 11, the coupling between inductors 10 and 11 is varied as described and oscillations are induced in inductor 11. However, in this case if the position of the mass of material is not changed the oscillations induced in inductor 11 are of opposite polarity than is the case for a mass of actual permeability higher than that of its surroundings, resulting in a frequency change in the oscillator section of tube 12 in the opposite direction.

Actually, if the mass of materal to be detected is disposed symmetrically about the axis of the winding of inductor 11, no voltage is induced in inductor 11 from inductor 10. However, in general, if exploring inductors 10 and 11 are carried along in close proximity to the ground in a search for a hidden mass of material of the type under consideration, it is inevitable that, at least during a portion of the time, the mass of material to be detected will not be symmetrically disposed with relation to the axis of inductor 11.

Due to the fact that tubes 23 and 23a are resistance coupled, there is very litle over-all phase shift in these amplifiers and the 90-degree phase shift, introduced in the circuit by the tuning of transformer 26 by condenser 7 insures that only a reactance component is introduced into the frequency-determining circuit 13, 14.

Any variation of the normal frequency of the first oscillator causes a beat note to be produced in the output circuit of the diode section of tube 37, due to the heterodyning of the oscillations developed by tube 12 and the oscillations developed by the second oscillator. This beat note is detected in the diode section of tube 37 and a voltage varying in accordance therewith is developed across resistor 48 in the manner described above. This audio-frequency voltage is, in turn, amplified in the two sections of tube 52 in order to produce an audible signal at the headset 57, thereby to indicate the presence of the mass of material to be detected.

The audio-frequency voltage developed in the output circuit of the pentode section of tube 52 is also applied to the impedance network comprising elements 61—66, inclusive. Condensers 65 and 66 are preferably of such values that resistors 62 and 63 are effectively not by-passed at low audio frequencies while resistor 62 is effectively by-passed by condenser 65 at an intermediate audio frequency and resistor 63 is effectively by-passed by condenser 66 at relatively high audio frequencies. This arrangement provides a frequency-responsive network such that a signal having an amplitude varying in accordance with frequency is supplied to the diode section of tube 52. Tube 68, in turn, amplifies the unidirectional component of the rectified signal developed across the resistor 61 by the diode section of tube 52 to provide a visual frequency indication on meter 60.

Various other positions of inductors 10 and 11 provide zero coupling between the inductors and are, therefore, suitable for use in a variable-frequency oscillatory system of the type just described. Some of these positions and the manner of determining the same are disclosed in the above-mentioned United States Letters Patent. However, in any practical system it is difficult to provide exactly zero coupling between exploring inductors 10 and 11 and it is for the purpose of reducing the effective coupling therebetween to a negligible value that the auxiliary means, including inductors 21 and 28 remote from exploring inductors 10 and 11, has been provided. Inductors 21 and 28 are also positioned, as above described, to have substantially no coupling therebetween and the coupling between inductors 21 and 28 can be varied by adjusting the coupling means 75 in a manner which is fully described in the above-identified United States Letters Patent, rendering further description thereof unnecessary in this specification. This adjustment in turn serves to reduce to zero the normal effective coupling between inductors 10 and 11.

The adjusting means including condenser 81 has been provided so that an initial adjustment of the detector system itself can be made and so that the latter can be tested and adjusted from time to time. Such adjustments may be necessary due to aging of the tubes, etc. In order so to adjust the circuit, switch 72 is operated so that contact c is open, thus effectively opening the filament circuit of tube 23. In this condition, the portion of the variable-frequency oscillatory system which includes inductors 10, 11, transformer 25, 26, amplifiers 23, 23a, and the control tube including the pentode section of tube 12, is completely inoperative and the frequency of the second oscillator is adjusted by means of condenser 81 so that it is exactly equal to the seventh harmonic frequency of the first oscillator. Under these conditions no audible beat note is produced at headset 57, and no indication is provided by meter 60. After this adjustment has been made, the contact c is closed, as shown in the drawings, rendering the variable-frequency oscillatory system fully operative. An audio signal will now be heard in headset 57 or indicated by meter 60 if there is any residual undesired coupling between exploring inductors 10 and 11. The adjusting screw 78 is adjusted until this beat note is no longer present and the set is ready for operation, as described above.

Fig. 2 comprises a graph utilized to illustrate the frequency shift of the controlled or first oscillator and the resulting beat frequency between the harmonic of the oscillations developed in tube 12 and those of oscillator 37 when a metal object is moved in a plane below inductor 11 and normal to the axis thereof. Thus, the dotted curve A' represents the frequency change of the first oscillator when the metal object is moved from the left to the axis of inductor 11, while dotted curve B' illustrates the frequency change when the object is moved from the axis of inductor 11 to the right. Corresponding beat frequencies obtained are represented by curves A, B, respectively.

Fig. 3 comprises a graph utilized to illustrate the frequency shift of the first oscillator and the beat frequency developed when a metal object is moved to the right or left of the axis of inductor 11 is moved forward or backward parallel to the axis of inductor 10. Thus, curve F represents the frequency change of oscillator 12 for one-half unit displacement to the right or left in the plane, while curve E represents the frequency change for a corresponding displacement of one unit. The resulting beat frequencies corresponding to the conditions represented by curves F and E are illustrated by curves D and C, respectively.

In utilizing the arrangement just described, the exploring inductors 10, 11 which may be about 12 inches or 15 inches in diameter are carried about six inches above the ground. Under normal conditions over barren ground there is no coupling between the inductors 10, 11 and no control voltage is supplied to the pentode section of tube 12. When a metallic body or a body having a permeability different from that of the ground being explored is in the immediate field of the inductor 10, currents are produced in inductor 10 which produce an auxiliary field. This field is unsymmetrical and induces a small voltage in inductor 11. The net effect is to produce a small effective coupling between inductors 10 and 11 through the body to be located. The arrangement is preferably designed so that the resultant beat frequency developed in the diode section of tube 37 approaches the upper limit of audibility when the object to be located is close to exploring inductors 10, 11. A metal object just below the surface of the ground provides a maximum indication when it is just to the right or left of the position directly below the exploring inductors 10, 11. When the center of the object is directly below the center of inductor 11 or directly ahead or behind that position, no indication is provided by the arrangement. However, if the exploring inductors are moved to the right or to the left of a position directly over an object to be located, a large indication is produced. A very accurate location of the object is, therefore, possible. The actual frequency shift of the first oscillator and the output indications increase as the size of the object is increased or when the object is buried in the ground at a shallower depth. The arrangement is preferably so proportioned that the amplitude of the beat-frequency voltage is just below the overload point of the beat-frequency amplifier tube 52 regardless of the frequency of the beat note. The ability to detect a small object by means of the headphones, therefore, depends only on the sensitivity of the human ear to low-frequency notes. The frequency heard in the headphones increases as the object to be located is approached, thus giving an easily distinguishable indication. The variable-frequency oscillatory system is preferably proportioned so that overloading of the tubes 23 and 23a in its feed-back network limits the maximum frequency shift which may be obtained. The meter 60 is provided for the reason that it is more sensitive at low frequencies than the human ear. The oscillatory system of the invention, being primarily sensitive only to the reactive component of coupling, therefore, largely ignores the presence of other components of coupling between terminals M, N and O, P which are in quadrature with the reactive component upon which the system is operated.

Figure 4:
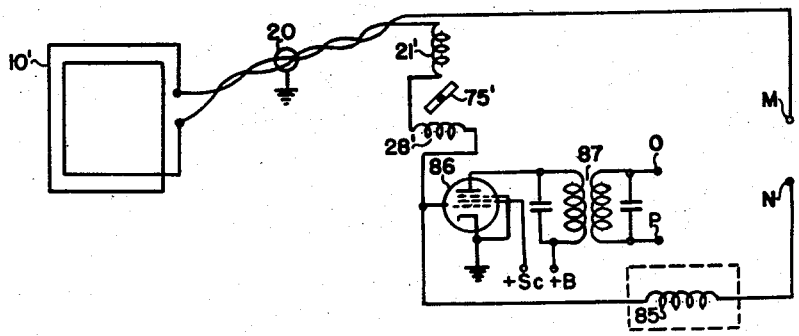

In Fig. 4 there is illustrated a modification of the variable-frequency oscillatory system of Fig. 1 which utilizes a variable impedance means comprising only a single exploring inductor. This oscillatory system can be utilized in a detector arrangement of the Fig. 1 type by disconnecting, from terminals M, N and O, P, the elements 10, 11, 21, 28, 25, 26 and 7 and by connecting correspondingly lettered terminals of Fig. 4 to the terminals of Fig. 1. In place of the pair of exploring inductors 10, 11 of Fig. 1, the arrangement of Fig. 4 provides a single exploring inductor 10' connected in one arm of a reactance bridge, another arm of which comprises a fixed inductor 85. Oscillations are supplied to inductor 10' from the first oscillator through the terminals M, N and means are provided for deriving oscillations from the impedance network having a characteristic which varies with the reactive effect of inductor 10' on the network or inductance bridge. This last-named means comprises a tube 86 having an input circuit connected across one diagonal of the reactance bridge and having an output circuit coupled through transformer 87 to the terminals O, P. An auxiliary adjusting arrangement, including inductors 21', 28' and 75' corresponding in all respects to those of similarly designated elements of Fig. 1 without the prime, is connected in series with one arm of the inductance bridge, specifically, is connected in series with the inductor 10', in order to vary the inductance of this arm of the bridge through a small range to effect an initial adjustment.

The operation of the oscillatory system including the modification illustrated in Fig. 4 is very similar to that of the system of Fig. 1 described above and will be understood by those skilled in the art. The system is initially so adjusted that, in the absence of a mass of material of either of the types described above in the vicinity of inductor 10', the inductance bridge comprising inductor 10' in one arm and inductor 85 in another arm is effectively balanced so that no voltage is supplied to the input circuit of tube 86. If necessary, the coupling means 75' is adjusted as described with reference to Fig. 1 in order to effect the initial balance of the bridge. The presence of a conductive body or a body having a permeability different from the permeability of the medium surrounding inductor 10' is effective to upset the balance of the bridge, thus causing a voltage to be supplied to the input circuit of tube 86, which voltage in turn is utilized to vary the frequency of the first oscillator in a manner similar to that described above with reference to the description of the operation of the circuit of Fig. 1.

While in each of the arrangements described, the effect of the feed-back circuit on the first oscillator is to vary the frequency of the first oscillator from some predetermined given frequency, it will be understood that an embodiment of the invention may comprise an arrangement in which the first oscillator is normally inoperative but is conditioned for operation and caused to oscillate due to the action of the feed-back circuit, its frequency being thereafter controlled as described above. It will be understood that the terminology "shift the frequency of the oscillator" is intended to apply also to an arrangement of this type.

While applicant does not intend to be limited to any particular circuit values in the embodiments of the invention described, there follows a set of circuit values which have been found to be particularly suitable for the variable-frequency oscillatory system and the detector arrangement of Fig. 1:

| | |
|---|---|
| Tubes 23, 23a and 68 | Type 1G6GT |
| Tubes 12, 37 and 52 | Type 3A8GT |
| Inductor 10 | 2 turns No. 14 enameled wire 15" in diameter |
| Inductor 11 | 3 turns No. 14 enameled wire 12" in diameter |

Inductors 10 and 11 are wound in grooves in rigid wooden coil forms and rigidly mounted at right angles to each other, as described.

| | |
|---|---|
| Load resistors 29, 32, 29a and 32a kilohms | 150 |
| Coupling condensers 30, 33, 30a and 33a micromicrofarads | 20 |
| Grid-leak resistors 31, 8, 9 and 22 kilohms | 100 |
| Resistor 15 kilohms | 2.2 |
| Condenser 16 microfarads | 0.01 |
| Condenser 17 micromicrofarads | 200 |
| Condenser 42 do | 20 |
| Condenser 38 do | 100 |
| Condenser 74 microfarads | 0.02 |
| Condenser 80 micromicrofarads | 50 |
| Condenser 81 do | 15 |
| Resistors 47 and 48 kilohms | 100 |
| Condensers 49 and 50 micromicrofarads | 100 |
| Resistors 61, 62 and 63 kilohms | 220 |
| Condenser 65 microfarads | 0.0001 |
| Condenser 66 do | 0.001 |
| Condenser 64 do | 0.02 |
| Resistor 69 megohms | 1 |
| B supply source 70 volts | 90 |
| A supply source 71 do | 1.5 |
| Frequency of first oscillator kilocycles | 100 |
| Frequency of second oscillator do | 700 |

While the variable-frequency oscillatory system has been described as utilized in an arrangement for locating a hidden mass of material, it will be understood that the invention is not intended to be limited to such application. The oscillatory system may, for example, be arranged to respond to variations in an impedance network due to variations in temperature of a variable impedance means included in the network and adapted, for one temperature thereof, to reduce to a minimum a component of coupling between the input and output terminals of the network.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A variable-frequency oscillatory system comprising, an impedance network having input and output terminals and including a passive mutual-reactance network normally balanced to provide a substantially zero value of feed-back voltage from said input to said output terminals, said mutual-reactance network being responsive to a frequency-control condition external thereto in space for modifying said balance of said network to provide feed-back voltage from said input to said output terminals, an oscillator for generating oscillations, means for applying said oscillations to said input terminals, means for amplifying the oscillations translated through said network to said output terminals, and means for applying the amplified oscillations back to said oscillator in such phase as to shift the oscillator frequency in response to said modification of said mutual-reactance network balance.

2. A variable-frequency oscillatory system comprising, a reactance network having input and output terminals and including a passive mutual-reactance network normally balanced to provide a substantially zero value of a reactive component of coupling between said input and said output terminals, said mutual-reactance network being responsive to a frequency-control condition external thereto in space for modifying said baalnce of said network to provide a reactive component of coupling between said input and said output terminals, an oscillator for generating oscillations, means for applying said oscillations to said input terminals, means for amplifying the oscillations translated through said network to said output terminals, and means for applying the amplified oscillations back to said oscillator in such phase as to shift the oscillator frequency in response to variation of said reactive component of coupling.

3. A variable-frequency oscillatory system having an operating frequency varied in response to the presence of a hidden mass of material of such nature as to have a different effect on an impedance network than does the substance surrounding the material comprising, an impedance network having input and output terminals and providing in the presence of said substance but in the absence of said mass of material a minimum value of one component of coupling between said input and output terminals, an exploring inductor included in said network and responsive substantially only to said mass of material for varying said one component of coupling, an oscillator for generating oscillations, means for applying said oscillations to said input terminals to excite said inductor with said oscillations, means for amplifying the oscillations translated through said network to said output terminals, and means for applying the amplified oscillations back to said oscillator in such phase as to shift the oscillator frequency in response to variation of said component of coupling.

4. A variable-frequency oscillatory system having an operating frequency varied in response to the presence of a hidden mass of material of such nature as to have a different effect on an impedance network than does the substance surrounding the material comprising, an impedance network having input and output terminals and providing in the presence of said substance but in the absence of said mass of material a minimum value of one component of coupling between said input and output terminals, a pair of exploring inductors included in said network and so disposed that the effective coupling between said inductors is normally low but is varied to an appreciable value in the presence of said mass of material to vary said one component of coupling, an oscillator for generating oscillations, means for applying said oscillations to said input terminals, means for amplifying the oscillations translated through said network to said output terminals, and means for applying the amplified oscillations back to said oscillator in such phase as to shift the oscillator frequency in response to variation of said component of coupling.

5. A variable-frequency oscillatory system having an operating frequency varied in response to the presence of a hidden mass of material of such nature as to have a different effect on an impedance network than does the substance surrounding the material comprising, an impedance network having input and output terminals and providing in the presence of said substance but in the absence of said mass of material a minimum value of one component of coupling between said input and output terminals, a pair of exploring inductors included in said network and so disposed that the axis of one of said inductors is normal to the axis of the other, thereby to render the effective coupling between said inductors normally low but variable to an appreciable value in the presence of said mass of material to vary said one component of coupling, an oscillator for generating oscillations, means for applying said oscillations to said input terminals, means for amplifying the oscillations translated through said network to said output terminals, and means for applying the amplified oscillations back to said oscillator in such phase as to shift the oscillator frequency in response to variation of said component of coupling.

6. A variable-frequency oscillatory system having an operating frequency varied in response to the presence of a hidden mass of material of such nature as to have a different effect on an impedance network than does the substance surrounding the material comprising, an impedance network having input and output terminals and providing in the presence of said substance but in the absence of said mass of material a minimum value of one component of coupling between said input and output terminals, a pair of exploring inductors included in said network and so disposed that the axis of one inductor is normal to the axis of the other inductor and in line with the center of said other inductor, thereby to render the effective coupling between said inductors normally low but variable to an appreciable value in the presence of said mass of material to vary said one component of coupling, an oscillator for generating oscillations, means for applying said oscillations to said input terminals, means for amplifying the oscillations translated through said network to said output terminals, and means for applying the amplified oscillations back to said oscillator in such phase as to shift the oscillator frequency in response to variation of said component of coupling.

7. A variable-frequency oscillatory system having an operating frequency varied in response to the presence of a hidden mass of material of such nature as to have a different effect on an impedance network than does the substance surrounding the material comprising, an impedance network having input and output terminals and providing in the presence of said substance but in the absence of said mass of material a minimum value of a reactive component of coupling between said input and output terminals, a pair of exploring inductors included in said network and so disposed that the reactive coupling between said inductors is normally low but is varied to an appreciable value in the presence of said mass of material to vary said reactive component of coupling, means for adjusting said normally low coupling so that it is inappreciable, an oscillator for generating oscillations, means for applying said oscillations to said input terminals, means for amplifying the oscillations translated through said network to said output terminals, and means for applying the amplified oscillations back to said oscillator in such phase as to shift the oscillator frequency in response to variation of said component of coupling.

8. A variable-frequency oscillatory system comprising an impedance network having input and output terminals and including a passive mutual-reactance network normally balanced to provide a substantially zero value of feed-back voltage from said input to said output terminals, said mutual-reactance network being responsive to a frequency-control condition external thereto in space for modifying said balance of said network to provide feed-back voltage from said input to said output terminals, an oscillator for generating oscillations, means for applying said oscillations to said input terminals, means for amplifying the oscillations translated through said network to said output terminals, means for applying the amplified oscillations back to said oscillator in such phase as to shift the oscillator frequency in response to said modification of said mutual-reactance network balance, and an auxiliary means remote from said impedance means for adjusting the effect of said impedance means on said network.

9. A variable-frequency oscillatory system comprising, an impedance network having input and output terminals and providing in the absence of an external frequency-control condition a minimum value of one component of coupling between said input and output terminals, impedance means included in said network and responsive substantially only to the occurrence of said condition for varying said one component of coupling, an oscillator for generating oscillations, means for applying said oscillations to said input terminals, means for amplifying the oscillations translated through said network to said output terminals, means for applying the amplified oscillations back to said oscillator in such phase as to shift the oscillator frequency in response to variation of said component of coupling, and means for adjusting the effect of said impedance on said network comprising a first inductor, a second inductor so disposed in the magnetic field of said first inductor that said second inductor is substantially uncoupled with said first inductor, a movable inductive coupling means so disposed with reference to said first and second inductors that in a given position in its path of motion it is substantially uncoupled with at least one of said first and second inductors and in another position in its path of motion it is substantially coupled with both of said first and second inductors, and means for moving said coupling means in said path to adjust the coupling between said first and second inductors.

LESLIE F. CURTIS.

REFERENCES CITED

The following references are of record in the file of this patent:

UNITED STATES PATENTS

| Number | Name | Date |
| --- | --- | --- |
| 1,952,701 | Chireix | Mar. 27, 1934 |
| 2,076,264 | Chireix | Apr. 6, 1937 |
| 2,312,687 | Curtis | Mar. 2, 1943 |
| 2,331,821 | Winlund | Oct. 12, 1943 |